(12) United States Patent
Sprenger et al.

(10) Patent No.: US 10,703,226 B2
(45) Date of Patent: Jul. 7, 2020

(54) LONGITUDINAL ADJUSTER FOR A VEHICLE SEAT, AND VEHICLE SEAT

(71) Applicant: Adient Luxembourg Holding S.á r.l., Luxembourg (LU)

(72) Inventors: Erik Sprenger, Wermelskirchen (DE); Martin Kuzma, Trencin (SK); Pavol Farkas, Povazska Bystrica (SK)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 0 days.

(21) Appl. No.: 16/304,410

(22) PCT Filed: May 24, 2017

(86) PCT No.: PCT/EP2017/062631
§ 371 (c)(1),
(2) Date: Nov. 26, 2018

(87) PCT Pub. No.: WO2017/202968
PCT Pub. Date: Nov. 30, 2017

(65) Prior Publication Data
US 2019/0176659 A1 Jun. 13, 2019

(30) Foreign Application Priority Data

May 27, 2016 (DE) .................... 10 2016 209 254
Jun. 21, 2016 (DE) .................... 10 2016 211 029

(51) Int. Cl.
*B60N 2/08* (2006.01)
*B60N 2/07* (2006.01)
*B60N 2/075* (2006.01)

(52) U.S. Cl.
CPC ............ *B60N 2/085* (2013.01); *B60N 2/075* (2013.01); *B60N 2/0722* (2013.01);
(Continued)

(58) Field of Classification Search
CPC ............................. B60N 2/0722; B60N 2/085
See application file for complete search history.

(56) References Cited

U.S. PATENT DOCUMENTS

| 9,120,400 B2* | 9/2015 | Ruthmann | B60N 2/0705 |
| 2003/0042387 A1* | 3/2003 | Schuler | B60N 2/0705 248/424 |

(Continued)

FOREIGN PATENT DOCUMENTS

| DE | 39 35 359 A1 | 5/1991 |
| DE | 103 42 724 A1 | 4/2005 |

(Continued)

*Primary Examiner* — Timothy J Brindley
(74) *Attorney, Agent, or Firm* — Marshall & Melhorn, LLC (57) ABSTRACT

A longitudinal adjuster (10) for a vehicle seat (1), has pairs of rails (12a, 12b) including a lower rail (14a) and an upper rail (14b) that are movable in a longitudinal direction (x) relative to one another and can be locked together by a locking device (16). An actuating device (18) has a transmission rod (22) arranged between the two locking devices. A hand grip (20), connected to the transmission rod, is provided for joint actuation of the two locking devices. The transmission rod is operatively connected to the two locking devices. A spring element (30), which applies a spring force to the actuating device toward a rest position or passive position, does not project beyond the locking device in the vertical direction (z). The spring element applies a torque to the transmission rod along the longitudinal extent thereof relative to the longitudinal direction (x).

18 Claims, 4 Drawing Sheets

(52) U.S. Cl.
CPC ......... *B60N 2/0818* (2013.01); *B60N 2/0875* (2013.01); *B60N 2/0881* (2013.01)

(56) References Cited

U.S. PATENT DOCUMENTS

| | | | | |
|---|---|---|---|---|
| 2012/0132777 A1* | 5/2012 | Nakamura | ........... | B60N 2/0705 248/429 |
| 2013/0302626 A1* | 11/2013 | Teufel | ................... | B60N 2/0818 428/429 |
| 2013/0320178 A1* | 12/2013 | Harvey | ................... | B60N 2/085 248/429 |
| 2014/0353454 A1* | 12/2014 | Yamada | ................ | B60N 2/0705 248/430 |
| 2016/0121760 A1* | 5/2016 | Kuhley | ................ | B60N 2/0806 248/429 |
| 2018/0222355 A1* | 8/2018 | Sprenger | .............. | B60N 2/0705 |

FOREIGN PATENT DOCUMENTS

| | | | |
|---|---|---|---|
| DE | 10 2006 021 884 B3 | 10/2007 | |
| DE | 10 2008 058 518 A1 | 5/2010 | |
| DE | 10 2010 049543 A1 | 4/2012 | |
| DE | 10 2012 006 060 A1 | 6/2013 | |
| DE | 10 2013 103 208 A1 | 10/2014 | |
| DE | 10 2014 219 868 A1 | 3/2016 | |
| DE | 10 2015 220 262 A1 | 2/2017 | |
| DE | 102016211029 A1 * | 11/2017 | ............. B60N 2/075 |
| EP | 3378696 A1 * | 9/2018 | ............. B60N 2/929 |
| JP | 2012-136138 A | 7/2012 | |
| JP | 2015093578 A * | 5/2015 | ............ B60N 2/0715 |
| WO | WO-2014065118 A1 * | 5/2014 | ............ B60N 2/0705 |
| WO | WO-2014125507 A2 * | 8/2014 | ............. B60N 2/085 |
| WO | 2016/050429 A1 | 4/2016 | |

\* cited by examiner

LONGITUDINAL ADJUSTER FOR A VEHICLE SEAT, AND VEHICLE SEAT

CROSS REFERENCE TO RELATED APPLICATIONS

This application is a United States National Phase Application of International Application PCT/EP2017/062631, filed May 24, 2017, and claims the benefit of priority under 35 U.S.C. § 119 of German Applications 10 2016 209 254.5, filed May 27, 2016 and 10 2016 211 029.2, filed Jun. 21, 2016, the entire contents of which are incorporated herein by reference.

TECHNICAL FIELD

The invention relates to a longitudinal adjuster for a vehicle seat having at least two pairs of rails, which are each formed from a lower rail and an upper rail, wherein the seat rail of each pair of seat rail mutually engage around each other and are movable relative to each other in the longitudinal direction and are each lockable to each other by means of a locking device, and wherein, for the mutual actuation of the two locking devices, an actuating device is provided with a transmission rod, which is arranged between the two locking devices, and with a handle, which is connected to the transmission rod, wherein the transmission rod is operatively connected to the two locking devices.

BACKGROUND

A longitudinal adjuster of the type mentioned is known, for example, from DE 10 2006 021 884 B3. The method provides a first seat rail connected to the vehicle structure and a second seat rail connected to the seat structure, said rails mutually engaging around each other and being movable relative to each other in the longitudinal direction. Furthermore, a rail lock, which is arranged substantially inside the rail profile, and an unlocking flap, which is arranged outside the rail profile and acts on the rail lock when actuated, are provided.

DE 10 2008 058 518 A1 discloses an actuating arrangement for a rail lock, which is inserted from outside into an opening in the seat rail via a lever.

Furthermore, DE 10 2015 220 262 A1 discloses a longitudinal adjuster for a vehicle seat, the actuating mechanism of which has at least one actuating arm, a release lever and a positioning element which is arranged on the release lever and is mounted pivotably at a free end of the release lever. Furthermore, the actuating mechanism comprises a covering which couples the actuating arm to the release lever. The release lever and the covering are arranged one inside the other here. In particular, the release lever is arranged in a slot of the covering. The free end of the release lever protrudes out of the covering.

DE 10 2014 219 868 A1 discloses a longitudinal adjuster of a vehicle seat, comprising at least one vehicle-mounted seat rail and a seat-mounted seat rail which mutually engage around each other forming a rail profile and are movable relative to each other in the longitudinal direction and are lockable to each other by means of a rail lock, and at least one actuating arrangement for actuating the rail lock, wherein at least one adapter is arranged between the actuating arrangement and the rail lock and is configured as a force transmission element in such a manner that at least two differently designed actuating arrangements are fastenable to the adapter.

DE 10 2012 006 060 A1 discloses an unlocking device which has a lever, at the one end of which a handle is provided and the other end of which interacts with a locking means, wherein the unlocking device has a spring means which pretensions the lever into its passive position, wherein the spring means fastens the lever to, in particular rotatably supports same on, the upper rail of the motor vehicle seat.

Further longitudinal adjusters of the type in question are known from DE 103 42 724 A1, DE 39 35 359 A1, JP 2012-135138 A and DE 10 2013 103 208 A1.

SUMMARY OF THE INVENTION

The invention is based on a problem of improving a longitudinal adjuster of the type mentioned at the beginning, in particular of reducing a required construction space, preferably a required installation height, and of providing a corresponding vehicle seat.

This problem is solved according to the invention by a longitudinal adjuster for a vehicle seat, having at least two pairs of seat rails, which are each formed from a lower rail, in particular a vehicle-mounted seat rail, and an upper rail, in particular a seat-mounted seat rail. The seat rails of each pair of seat rails mutually engage around each other and are movable relative to each other in the longitudinal direction. The seat rails of each pair of seat rails are lockable to each other by means of a locking device. For the joint actuation, in particular for the simultaneous unlocking, of the two locking devices, an actuating device is provided with a transmission rod, which is arranged between the two locking devices, and a handle, which is connected to the transmission rod. The transmission rod is operatively connected to the two locking devices. Furthermore, it is provided that a spring element which acts on the actuating device with a spring force in the direction of an inoperative position or passive position does not protrude over the locking device in the vertical direction.

Owing to the fact that a spring element which acts upon the actuating device with a spring force in the direction of an inoperative position or passive position does not protrude over the locking device in the vertical direction, a required construction space between a vehicle structure located below the lower rail and a seat structure mounted on the upper rail, in particular an installation height of the longitudinal adjuster, can be reduced further, as a result of which more clearance is provided for a possible seat height adjuster. The configuration of the lower rail as a vehicle-mounted seat rail generally means a seat rail which is connectable to a vehicle structure. Similarly, a configuration of the upper rail as a seat-mounted seat rail is generally understood as meaning a seat rail which is connectable to a seat structure.

Advantageous refinements which can be used individually or in combination with one another are the subject matter of the dependent claims.

The transmission rod can be shifted downward in such a manner that the transmission rod and the actuating device do not protrude over the locking device in the vertical direction.

The spring element can be configured as a spring-elastic wire bending part, in particular as a spring wire shaped part. The spring element can be a yoke spring. The spring element can have a U shaped portion which engages around the handle from above. One end of the spring element can run downward around the transmission rod from the U shaped portion and can at least partially engage around the transmission rod such that secure support is made possible. A further end of the spring element can likewise run through from the U shaped portion to below the transmission rod and can subsequently merge into an end portion which is bent over to the side by approximately 70° to 90°, wherein the end portion is provided to be supported on the upper rail from above.

Furthermore, it can be provided that the spring element acts upon both the handle with a torque which is directed downward relative to a center axis of the transmission rod, and also acts upon the transmission rod along the longitudinal extent thereof with a torque relative to the longitudinal direction.

The spring element can lie against five contact points, in particular can be supported by five contact points. The spring element can lie against the upper rail and/or the transmission rod and/or the handle.

In this connection, the actuating device can have a receptacle for the spring element. The receptacle can be an impression and/or depression in a surface of the actuating device. The receptacle can preferably be arranged in the handle. A depth of the receptacle can be coordinated with a thickness of the spring element, in particular a wire portion of the spring element. The receptacle serves for securely fastening the spring element to, and/or holding same on, the actuating device.

A first end of the spring element can be supported on the upper rail, in particular at the first contact point. Alternatively or additionally, a second end of the spring element can be supported on the transmission rod, in particular at a fifth contact point.

Furthermore, at least one of the adapters can be connected to the transmission rod and/or the actuating device in a force-fitting and/or integrally bonded manner.

A center axis of the transmission rod can preferably be arranged offset downward with respect to a center axis of a connecting region of the unlocking lever, as viewed in the vertical direction, as a result of which the overall height of the longitudinal adjuster can be reduced further.

The problem is furthermore solved by a vehicle seat having a longitudinal adjuster according to the above description.

The invention is explained in more detail below with reference to an advantageous exemplary embodiment which is illustrated in the figures. However, the invention is not restricted to this exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Referring to the drawings, a vehicle seat 1 which is illustrated schematically in FIG. 1 will be described below using three spatial directions running perpendicularly to one another. With a vehicle seat 1 installed in the vehicle, a longitudinal direction x runs substantially horizontally and preferably parallel to a vehicle longitudinal direction which corresponds to the customary direction of travel of the vehicle. A transverse direction y running perpendicularly to the longitudinal direction x is likewise oriented horizontally in the vehicle and runs parallel to a vehicle transverse direction. A vertical direction z runs perpendicularly to the longitudinal direction x and perpendicularly to the transverse direction y. With a vehicle seat 1 installed in the vehicle, the vertical direction z runs parallel to the vehicle vertical axis.

The position specifications and direction specifications used, such as front, rear, top and bottom, relate to a viewing direction of an occupant seated in the vehicle seat 1 in a normal seat position, wherein the vehicle seat 1 is installed in the vehicle and is oriented in a use position suitable for passenger transport, with an upright backrest 5 and in the driving direction as customary. However, the vehicle seat 1 according to the invention may also be installed in a different orientation, for example transversely with respect to the driving direction.

Figure 1:
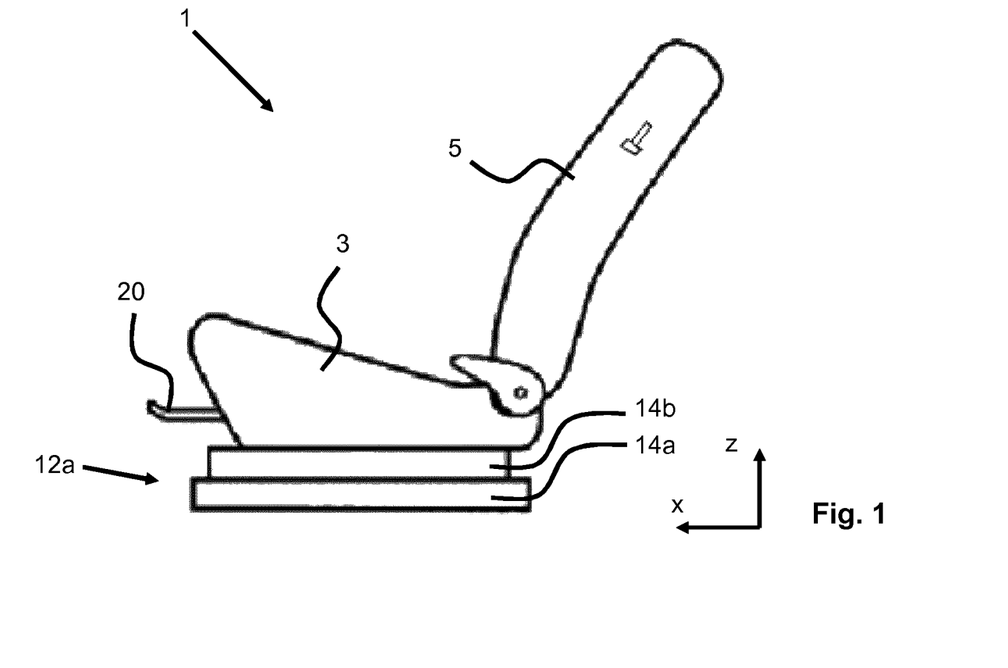
FIG. 1 is a schematic view showing vehicle seat having a longitudinal adjuster according to the invention.

The vehicle seat 1, which is shown in FIG. 1, for a motor vehicle has a seat part 3 and a backrest 5 which is adjustable in its inclination relative to the seat part 3. An inclination of the backrest 5 can be adjustable, for example, by means of a latching fitting or a geared fitting. The vehicle seat 1 is mounted on a longitudinal adjuster 10 for the adjustment of a seat longitudinal position.

Figure 2:
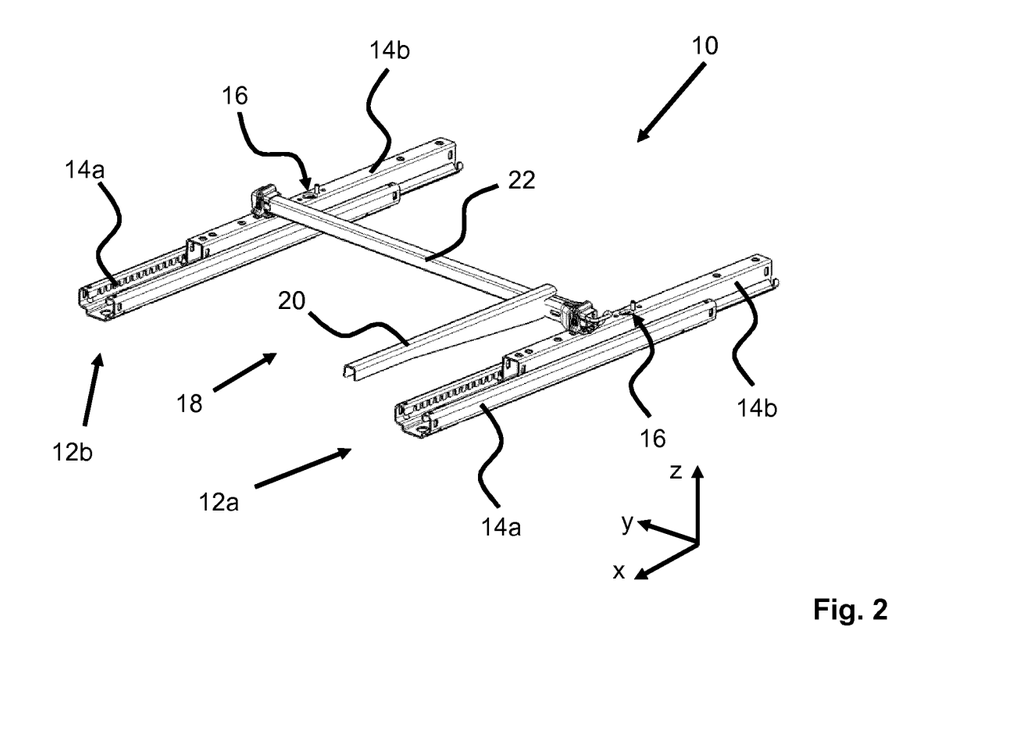
FIG. 2 is a perspective view showing an example of a longitudinal adjuster.

FIG. 2 shows, in a perspective illustration, a longitudinal adjuster 10 of the type in question for a vehicle seat 1, for example, from the patent application DE 10 2015 220 262. The longitudinal adjuster 10 has two pairs of seat rails 12a, 12b, which are each formed from a lower rail 14a, in particular a vehicle-mounted seat rail, and an upper rail 14b, in particular a seat-mounted seat rail. The seat rails 14a, 14b of each pair of seat rails 12a, 12b mutually engage around each other and are movable relative to each other in the longitudinal direction x. Furthermore, the upper rails 14b and the lower rails 14a of the respective pair of seat rails 12a, 12b are lockable to each other by means of a locking device 16, wherein, for the joint actuation of the two locking devices 16, an actuating device 18 is provided with a transmission rod 22, which operatively connects the two locking devices 16, wherein the transmission rod 22 is configured to be continuous and interacts with the two locking devices 16. The actuating device 18 furthermore has a handle 20 which acts on the transmission rod 22.

The handle 20 is arranged closer to the locking device 16 of the inner pair of seat rails 12a than to the locking device 16 of the outer pair of seat rails 12b. The inner pair of seat rails 12a customarily means the tunnel-side pair of seat rails facing the respectively adjacent driver' seat or front passenger' seat. The outer pair of seat rails 12b customarily denotes the pair of seat rails facing a vehicle door. Accordingly, a longitudinal adjuster 10 illustrated in the present case is configured for use with a front passenger' seat. A corresponding longitudinal adjuster 10 suitable for a driver's seat would be considered mirror-symmetrically with respect to a plane perpendicular to the transverse direction y.

A possible distribution of 88% of the force introduced via the handle 20 to the locking device 16 of the inner pair of seat rails 12a and 12% of the force to the locking device 16 of the outer pair of seat rails 12b result therefrom, depending on the distances of the handle 20 from respective unlocking levers 40 of the two locking devices 16. An individual force introduced into the respective unlocking lever 40 can be determined, for example, with reference to the angle of rotation of said unlocking lever. In the case of the longitudinal adjuster 10 of the type in question, the locking device 16 of the inner pair of seat rails 12a is therefore loaded substantially higher than the locking device 16 of the outer pair of seat rails 12b. For manufacturing and economical reasons, the seat rails 14a, 14b of the two pairs of seat rails 12a, 12b are very substantially manufactured with the same design and same dimensioning. This results in overdimensioning of the longitudinal adjuster 10 on account of a required minimum load-bearing capacity.

Figure 3:
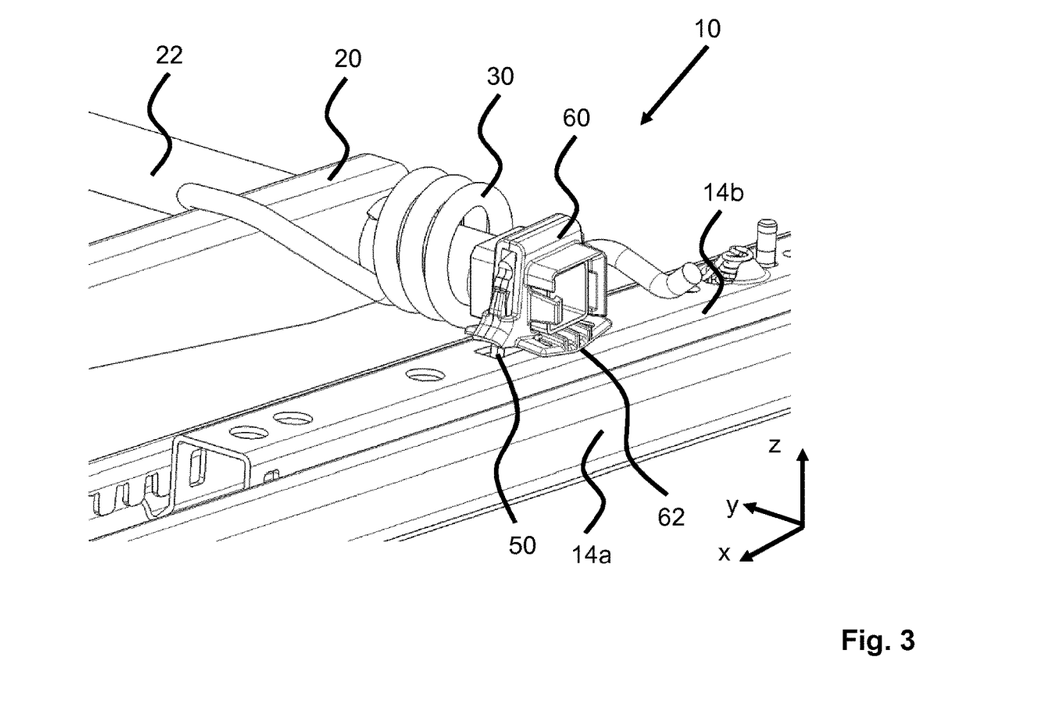
FIG. 3 is an enlarged detail perspective view of the longitudinal adjuster from FIG. 2.
Figure 4:
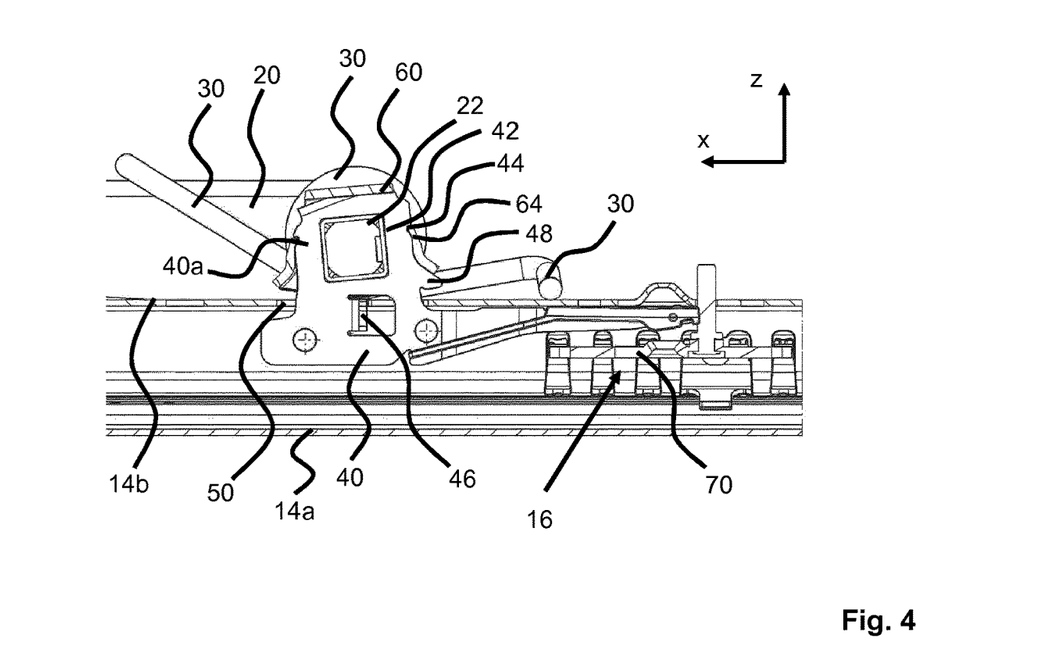
FIG. 4 is a sectional view of the detail of the longitudinal adjuster from FIG. 3 perpendicularly to the transverse direction.

FIG. 3 shows an enlarged detail of the longitudinal adjuster 10 from FIG. 2, in particular a region of the connection of the transmission rod 22 to the locking device 16, which is arranged in the upper rail 14b. FIG. 4 shows a sectional illustration of the detail of the longitudinal adjuster 10 from FIG. 3 from a viewing angle parallel to the transverse direction y. FIGS. 3 and 4 are jointly described below.

The transmission rod 22 has a circular cross section, but may also be considered differently therefrom. In the region of the connection of the transmission rod 22 to the locking device 16 arranged in the upper rail 14b, a shape differing from a rotationally symmetrical cross-sectional shape, in the present case a square cross-sectional shape, is provided for better transmission of a torque to an unlocking lever 40 of the locking device 16. The unlocking lever 40 is partially arranged inside the upper rail 14b and partially outside, preferably above, the upper rail 14b. Pivoting of the unlocking lever 40 brings about unlocking of the locking device 16.

In order to secure the unlocking lever 40 against displacement in the longitudinal direction x, the unlocking lever 40 has at least one retaining lug 46 which protrudes in the transverse direction y and is arranged in a corresponding recess, for example a slot-shaped widened portion at a through opening 50 in the upper rail 14b. The unlocking lever 40 is customarily arranged in the through opening 50 with play and can therefore produce a metallic contact noise when two contact surfaces, one on the unlocking lever 40 and one on the upper rail 14b, strike against each other.

The locking device 16 comprises at least one plate-like locking element 70 which is guided movably between a locking position and a release position. If the locking element 70 is in the locking position, the two seat rails 14a, 14b of the respective pair of seat rails 12a, 12b are locked to each other and a corresponding relative movement of the seat rails 14a, 14b with respect to each other is prevented. The locking element 70 is customarily held in the upper rail 14b in a spring-loaded manner in the direction of the locking position. The locking element 70 of the locking device 16 is actuable by means of the unlocking lever 40, in particular is movable in the direction of the release position counter to a spring force. Accordingly, the seat rails 14a, 14b are displaceable relative to each other in the longitudinal direction x when the locking element 70 is in the release position.

The unlocking lever 40 can have a stop 48 as a stopper in the vertical direction z, in particular as an end stop of a movement of the unlocking lever 40, in order in particular to protect the locking element 70 of the locking device 16 against excessive strain and misuse forces. The unlocking lever 40 is pre-fixed on the upper rail 14b in the vertical direction z by means of the stop 48. In other words, the unlocking lever 40 is hooked into the through opening 50 of the upper rail 14b by means of the stop 48. The mass center of gravity of the unlocking lever 40 should be taken into consideration here, which, because of the arms (not denoted specifically) of the unlocking lever 40 that are arranged in the interior of the upper rail 14b, can be arranged in a region below the stop 48.

For the automatic holding of the handle 20 of the actuating device 18 in a passive position or inoperative position, said handle is held in a spring-pretensioned manner on the inner pair of seat rails 12a here by means of a spring element 30. For this purpose, the spring element 30, here in the form of a leg spring, is arranged between the handle 20 and the upper rail 14b and pretensions the handle 20 here in the direction of the inoperative position or passive position. The spring element 30 engages around sections of the transmission rod 22 and is supported with its two ends respectively on the upper rail 14b and on the handle 20, which protrudes from the transmission rod 22, and thereby pretensions the upper rail 14b and the handle 20 relative to each other by means of a spring force.

The respective part of the unlocking lever 40 that protrudes out of the through opening 50 forms a connecting region 40a for holding or connecting to the actuating device 18 for rotation therewith, and is provided with a covering 60. The respective covering 60 is configured in such a manner that the latter holds the associated connection region 40a of the unlocking lever 40 enclosed in a form-fitting and/or force-fitting manner, and therefore the unlocking lever 40 is held on the upper rail 14b during the installation of the transmission rod 22. Furthermore, the respective covering 60 is configured in such a manner that, in order to restrict an insertion depth, the covering 60 forms an end stopper for the insertable transmission rod 22, and therefore the inserted transmission rod 22 can be fixed between the two pairs of seat rails 12a, 12b by means of the covering 60. The end stopper is formed here in the form of a protruding hook.

Furthermore, the covering 60 has a retaining element 64 for holding the connecting region 40a of the unlocking lever 40, which is introduced into the covering 60, in particular into a cavity of the covering 60. The connecting region 40a has a retaining element 44 which is designed in a manner corresponding to the retaining element 64, and therefore the retaining elements 44, 64 are connected to each other releasably, in particular are connected to each other in a latching manner, in the assembled state. The retaining element 64 is, for example, in the form of a clip or latching hook, wherein the retaining element 44 is correspondingly in the form of a groove or depression.

For easier introduction of the transmission rod 22 into the covering 60, the covering 60 can have an inner-wall guide surface. Furthermore, the covering 60 can be formed in a flexible manner in a supporting region 62, which faces the upper rail 14b, in order to compensate for forces acting on the upper rail 14b in the vertical direction z. For this purpose, the supporting region 62 is correspondingly formed, for example is arched forming a downwardly directed apex point and is inclined outward at an angle with respect to the transverse direction y.

Figure 5:
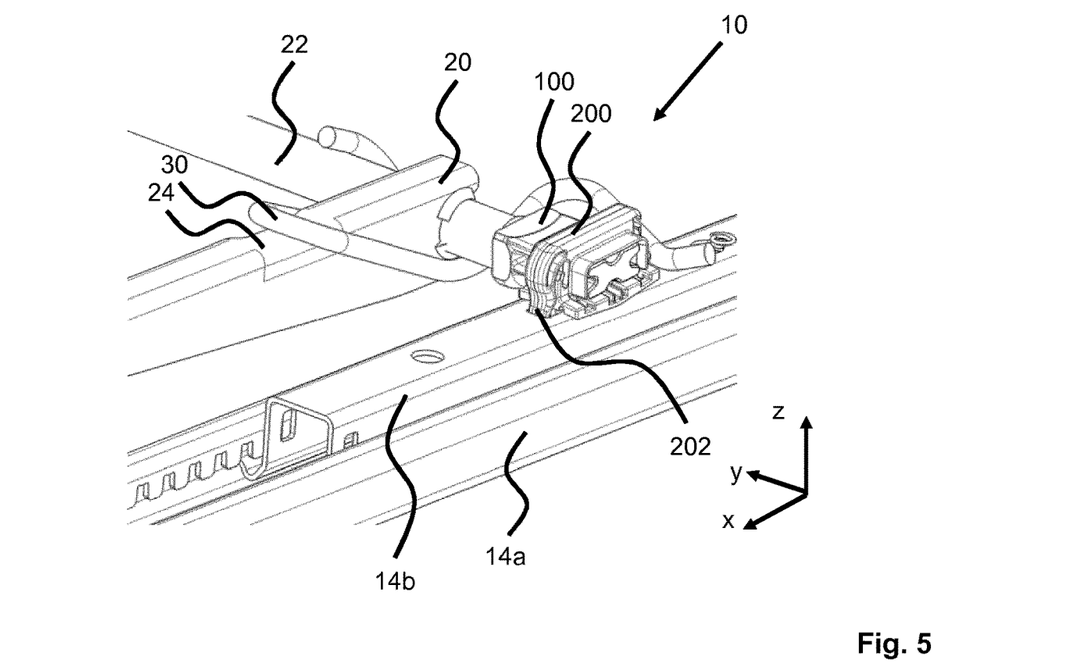
FIG. 5 is perspective view showing a view corresponding to the illustration of FIG. 3 of a longitudinal adjuster according to the invention.

FIG. 5 shows an illustration, corresponding to FIG. 3, of a longitudinal adjuster 10 according to the invention. The longitudinal adjuster 10 according to the invention very substantially corresponds to the previously described longitudinal adjuster 10, and therefore identical components or components acting in an identical manner also have the same reference signs. The transmission rod 22 of the longitudinal adjuster 10 is operatively connected to the locking device 16, here of the inner pair of seat rails 12a, via a corresponding adapter 100.

To avoid rattling noises and for automatically holding the actuating device 18 in a neutral position or inoperative position, in which the locking devices 16 are locked, the handle 20 of the actuating device 18 is held in a spring-pretensioned manner in relation to the upper rail 14b. For this purpose, the spring element 30, here in the form of a yoke spring, is arranged between the actuating device 18 and the upper rail 14b and pretensions the handle 20 of the actuating device 18 here in the neutral position or inoperative position. The spring element 30 which is shown in FIG. 5 has a U shaped portion which engages around the handle 20 from above. One end of the spring element runs downward around the transmission rod 22 from the U shaped portion and at least partially engages around the transmission rod 22 such that secure holding is made possible. A further end of the spring element 30 likewise runs through below the transmission rod 22 from the U shaped portion and subsequently merges into an end portion which is bent over to the side by approximately 70° to 90°. The end portion runs substantially parallel to the transverse direction y. The end portion rests at the top on the upper rail 14b of the inner pair of seat rails 12a and is supported on the upper rail 14b from above.

The connecting region 40a of the unlocking lever 40 that protrudes out of a through opening 50 in the upper rail 14b is provided with a covering 200. The covering 200 is configured in such a manner that it holds an associated profile portion 104 of the adapter 100 in a form-fitting and/or force-fitting manner such that the transmission rod 22 together with the adapter 100 is held in the vehicle or on the vehicle seat 1 during the installation of the longitudinal adjuster 10. Furthermore, the adapter 100 can be configured in such a manner that said adapter has a restriction of the insertion depth into an opening 42 of the unlocking lever 40 by means of an end stop, and therefore said adapter is fixed, in particular clamped, between the two pairs of seat rails 12a, 12b.

The covering 200 can have a supporting arm 202 which, in the mounted state, engages in the through opening 50 of the upper rail 14b. The supporting arm 202 is preferably arranged forward in the longitudinal direction x relative to the unlocking lever 40 and acts upon the unlocking lever 40 with a pretensioning force parallel to the longitudinal direction x. The covering 200 is supported here together with the connecting region 40a, which is held in the covering 200, of the unlocking lever 40 on an edge portion, which is positioned in the longitudinal direction x, of the through opening 50 by means of the supporting arm 202. By means of the action upon the unlocking lever 40 with a pretensioning force in the longitudinal direction x, the holding lug 46 (shown in FIG. 8) of the unlocking lever 40 can be brought into contact with an edge region of the through opening 50, in particular with an edge region lying opposite the supporting arm 202, and can preferably remain continuously in contact. Contact noises occasionally occurring by striking of the retaining lug 46 are therefore avoided.

Figure 6:
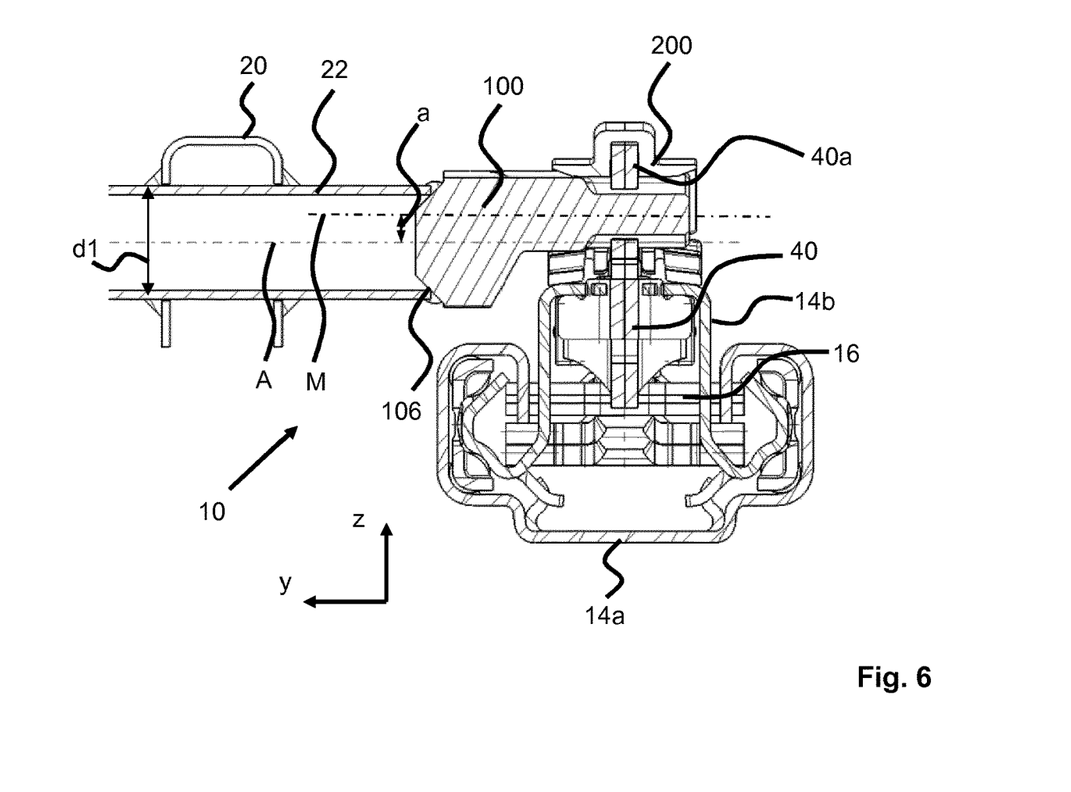
FIG. 6 is a partial cross-sectional illustration of the longitudinal adjuster from FIG. 5.

It can be gathered from the sectional illustration of FIG. 6 that the transmission rod 22 extends along a center axis A. The adapter 100 is configured in such a manner that the profile portion 104 extends along a center axis M which runs parallel, or at a distance a, to the center axis A of the transmission rod 22. The adapter 100 is furthermore connected to the transmission rod 22 via a frustoconical connecting portion 106. The cross section of the connecting portion 106, which tapers in diameter, serves for possible connection to transmission rods 22 of different diameter d1. The transmission rod 22 is customarily of hollow-cylindrical configuration and, in accordance with its diameter d1, is completely connected to the adapter 100 in the region of a corresponding cross-sectional extent of the frustoconical connecting portion 106.

Figure 7:
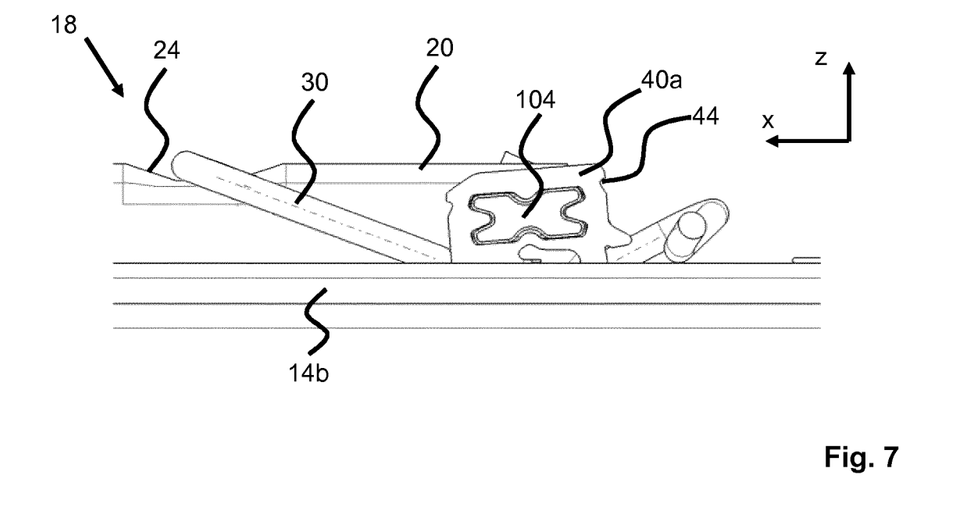
FIG. 7 is a side view of the longitudinal adjuster from FIG. 5 without a covering.

FIG. 7 shows a side view of the longitudinal adjuster 10 from FIG. 5 without covering 200. It is in particular shown here that the actuating device 18 has a receptacle 24 for the spring element 30. The receptacle 24 is configured in the form of a depression in the handle 20 of the actuating device 18. A depth of the receptacle 24, i.e. an offset relative to the outer surface of the handle 22, is coordinated here with a thickness of the spring element 30, which is configured as a spring wire, in such a manner that an upper edge of the spring element 30 in the region of the receptacle 24 does not protrude in the vertical direction z over the size of the covering 200, which is not illustrated in FIG. 7 for illustrative reasons. The receptacle 24 furthermore serves for securely fastening the spring element 30 to, and/or holding same on, the handle 20 of the actuating device 18.

Figure 8:
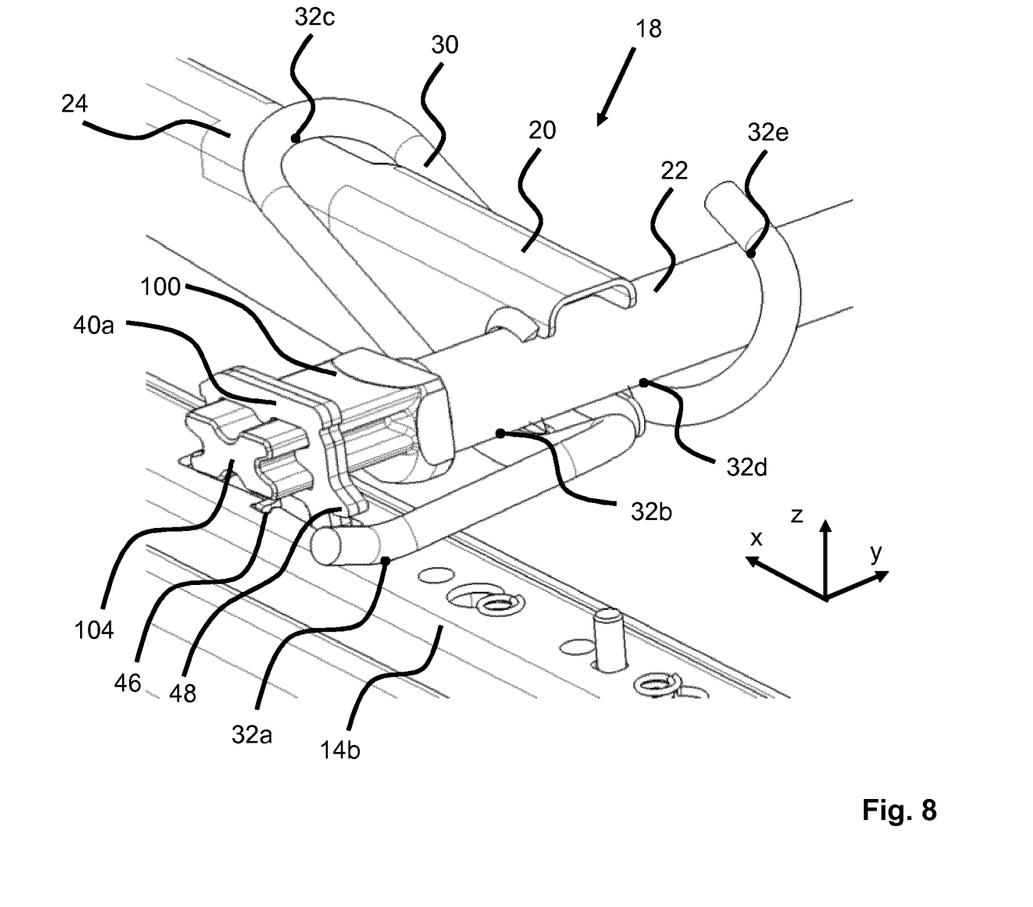
FIG. 8 is a perspective view of the longitudinal adjuster from FIG. 5 from a different viewing angle.

FIG. 8 shows a perspective view of the longitudinal adjuster 10 from FIG. 5 from a different viewing angle. A preferred position of five contact points 32a, 32b, 32c, 32d, 32e of the spring element 30 can in particular be gathered from the illustration of FIG. 8. It is made possible by this multiple support of the spring element 30 that the spring element 30 acts upon the handle 20 via a contact point 32c between the spring element 30 and the handle 20 with a torque in a direction which brings about a pivoting movement relative to the center axis A of the transmission rod 22 and pretensions the actuating device 18 in the direction of an inoperative position. At the same time, the spring element 30 acts upon the transmission rod 22 with a torque relative to the longitudinal direction x by support via a contact point 32a between the spring element 30 and the upper rail 14b, along the longitudinal extent thereof, as a result of which that end of the transmission rod 22 which is further away from the spring element 30 is always brought into contact with the corresponding unlocking lever 40, and possible rattling or the like is avoided.

The features which are disclosed in the above description, the claims and the drawings may be of significance both individually and in combination for implementing the invention in its various refinements.

Although the invention has been described in detail in the drawings and the preceding description, the descriptions should be understood as being illustrative and exemplary and not restrictive. In particular, the searching of the graphically illustrated proportions of the individual elements should not be interpreted as required or restrictive. Furthermore, the invention is in particular not restricted to the exemplary embodiments explained. Further variants of the invention and the implementation thereof are apparent to a person skilled in the art from the preceding disclosure, the figures and the claims. While specific embodiments of the invention have been shown and described in detail to illustrate the application of the principles of the invention, it will be understood that the invention may be embodied otherwise without departing from such principles.

The invention claimed is:

1. A longitudinal adjuster for a vehicle seat, the longitudinal adjuster comprising:
   at least two pairs of rails each pair of rails being formed from a lower rail and an upper rail, wherein the lower and upper rails mutually engage each other and are movable relative to each other in a longitudinal direction;
   two locking devices, wherein the lower and upper rails and are each lockable to each other by means of one of the two locking devices;
   an actuating device for the mutual actuation of the two locking devices, the actuating device comprising;
   a transmission rod arranged between the two locking devices, and
   a handle, which is connected to the transmission rod, wherein the transmission rod is operatively connected to the two locking devices; and
   a spring element acting upon the actuating device with a spring force in a direction of an inoperative position or passive position, wherein the spring element does not protrude over the locking device in a vertical direction and acts upon the transmission rod along a longitudinal extent thereof with a torque relative to the longitudinal direction;
   wherein the spring element lies against the longitudinal adjuster at five contact points.

2. The longitudinal adjuster as claimed in claim 1, wherein the transmission rod is shifted downward such that the transmission rod and the actuating device do not protrude over the locking device in the vertical direction.

3. The longitudinal adjuster as claimed in claim 1, wherein the spring element is configured as a spring-elastic wire bending part.

4. The longitudinal adjuster as claimed in claim 3, wherein the spring element is configured as a spring wire shaped part.

5. The longitudinal adjuster as claimed in claim 1, wherein the spring element is supported via the five contact points.

6. The longitudinal adjuster as claimed in claim 1, wherein the actuating device has a receptacle for the spring element.

7. The longitudinal adjuster as claimed in claim 6, wherein the receptacle is provided by the handle.

8. The longitudinal adjuster as claimed in claim 1, wherein a first end of the spring element is supported on the upper rail.

9. The longitudinal adjuster as claimed in claim 8, wherein a first end of the spring element is supported on the upper rail at a contact point.

10. The longitudinal adjuster as claimed in claim 1, wherein a second end of the spring element is supported on the transmission rod.

11. The longitudinal adjuster as claimed in claim 10, wherein a second end of the spring element is supported on the transmission rod at a contact point.

12. The longitudinal adjuster as claimed in claim 1, wherein a center axis of the transmission rod is arranged offset downward in the vertical direction with respect to a center axis evil of a connecting region of an unlocking lever.

13. The longitudinal adjuster as claimed in claim 1, further comprising adapters, wherein the transmission rod is operatively connected to the locking devices via the adapters, and at least one of the adapters is connected to the transmission rod and/or to the actuating device in a force-fitting or integrally bonded manner.

14. A vehicle seat having a longitudinal adjuster comprising:
   at least two pairs of rails, each pair of rails being formed from a lower rail and an upper rail, wherein the lower and upper rails mutually engage each other and are movable relative to each other in a longitudinal direction;
   two locking devices, wherein the lower and upper rails and are each lockable to each other by means of one of the two locking devices;
   an actuating device for the mutual actuation of the two locking devices, the actuating device comprising a transmission rod arranged between the two locking devices, and a handle, which is connected to the transmission rod, wherein the transmission rod is operatively connected to the two locking devices; and
   a spring element acting upon the actuating device with a spring force in a direction of an inoperative position or passive position, wherein the spring element does not protrude over the locking device in a vertical direction and acts upon the transmission rod along a longitudinal extent thereof with a torque relative to the longitudinal direction;
   wherein the spring element lies against the longitudinal adjuster at five contact points and the spring element is supported via the five contact points.

15. The vehicle seat as claimed in claim 14, wherein the transmission rod is shifted downward such that the transmission rod and the actuating device do not protrude over the locking device in the vertical direction.

16. The vehicle seat as claimed in claim 14, wherein the actuating device has a receptacle, provided by the handle, for the spring element.

17. The vehicle seat as claimed in claim 14, wherein a first end of the spring element is supported on the upper rail at a contact point.

18. The vehicle seat as claimed in claim 14, wherein the longitudinal adjuster further comprises adapters, wherein the transmission rod is operatively connected to the locking devices via the adapters, and at least one of the adapters is force-fit and/or integral bond connected to the transmission rod and/or to the actuating device.

* * * * *